(12) United States Patent
Defibaugh et al.

(10) Patent No.: US 7,500,611 B2
(45) Date of Patent: Mar. 10, 2009

(54) VERTICAL MOUNT SMART CARD READER ASSEMBLY

(75) Inventors: George Richard Defibaugh, Harrisburg, PA (US); James Lee Fedder, Etters, PA (US); Richard Elof Hamner, Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/524,007

(22) Filed: Sep. 20, 2006

(65) Prior Publication Data

US 2008/0121706 A1    May 29, 2008

(51) Int. Cl.
  *G06K 7/08*    (2006.01)
  *G06K 7/06*    (2006.01)
(52) U.S. Cl. ........................... 235/451; 235/441
(58) Field of Classification Search ......... 235/435–459, 235/474–479, 483–486; 361/736–737; 439/217, 439/218, 221, 223, 224, 79
See application file for complete search history.

(56) References Cited

U.S. PATENT DOCUMENTS

| | | | | |
|---|---|---|---|---|
| 4,847,588 A * | 7/1989 | Doutrich | ..................... | 439/751 |
| 5,224,873 A * | 7/1993 | Duffet et al. | ................. | 439/326 |
| 5,409,399 A * | 4/1995 | Geoghegan et al. | ......... | 439/567 |
| 5,667,397 A * | 9/1997 | Broschard et al. | ........... | 439/188 |
| 5,725,386 A * | 3/1998 | Davis et al. | .................... | 439/79 |
| 6,015,092 A * | 1/2000 | Postlewaite et al. | ......... | 235/486 |
| 6,095,872 A * | 8/2000 | Lang et al. | ............... | 439/733.1 |
| 6,134,114 A * | 10/2000 | Ungermann et al. | ........ | 235/486 |
| 6,162,122 A * | 12/2000 | Acres et al. | .................. | 235/382 |
| 6,293,464 B1 * | 9/2001 | Smalley, Jr. | ................. | 235/441 |
| 6,319,061 B1 * | 11/2001 | Chen et al. | .................. | 439/607 |
| 6,416,359 B1 * | 7/2002 | Zhang et al. | ................. | 439/607 |
| 6,503,092 B1 * | 1/2003 | Sato | ........................... | 439/159 |
| 6,527,187 B1 * | 3/2003 | Nagata et al. | ............... | 235/475 |
| 6,655,590 B1 * | 12/2003 | McFeely et al. | ............. | 235/451 |
| 6,786,415 B2 * | 9/2004 | Yiu | ........................... | 235/486 |

* cited by examiner

*Primary Examiner*—Seung H Lee
*Assistant Examiner*—Christle I Marshall

(57) ABSTRACT

According to an aspect of the present disclosure, a card reader for mounting onto a printed circuit board and for selectively receiving a data card therein is provided. The card reader includes a base; at least a side wall extending from the base; and a receiving slot defined by at least the base and the side wall and being configured and dimensioned to selectively receive the data card therein. The receiving slot defines a plane that is substantially orthogonal to a plane of the printed circuit board.

20 Claims, 11 Drawing Sheets

VERTICAL MOUNT SMART CARD READER ASSEMBLY

BACKGROUND

1. Technical Field

The present disclosure relates to card reader assemblies and, more particularly, to smart card reader assemblies for receiving a smart card or the like and for mounting on a printed circuit board or the like.

2. Discussion of Related Art

Card readers which accept smart cards and the like are typically mounted on a printed circuit board (hereinafter, referred to as the "PCB") or the like in a horizontal orientation, i.e., wherein a slot of the card reader is oriented horizontally or parallel to a plane of the PCB. By having the housing of the card reader oriented in such a manner, the card reader includes a footprint that occupies a relatively large area on the PCB thereby reducing the area of the PCB on which other items or components may be mounted.

It is desirable to reduce the area on the PCB lost to the footprint of the card reader in order to maximize the usable area of the PCB.

A need thus exists for a card reader that has a reduced footprint on a PCB thereby increasing the usable area of a PCB and increasing the number of components that can be mounted thereto.

SUMMARY

The present disclosure relates to card readers that are configured and adapted to reduce the footprint on a PCB and increase the useable area of the PCB for mounting other and/or more components thereto.

According to an aspect of the present disclosure, a card reader for mounting onto a printed circuit board and for selectively receiving a data card therein is provided. The card reader includes a base; at least a side wall extending from the base; and a receiving slot defined by at least the base and the side wall and being configured and dimensioned to selectively receive the data card therein. The receiving slot defines a plane that is substantially orthogonal to a plane of the printed circuit board.

The card reader may include at least one electrical contact configured to electrically interconnect the data card and the printed circuit board when the data card is inserted into the receiving slot of the card reader.

It is envisioned that the receiving slot of the card reader may be oriented such that when the data card is inserted into the receiving slot a plane of the data card is substantially orthogonal to the plane of the printed circuit board.

The card reader may include at least one guide provided near a front end of the receiving slot for guiding an insertion end of the data card into the receiving slot. The card reader may further include at least one retaining tab at least partially extending into the receiving slot for frictionally engaging the data card when the data card is inserted into the receiving slot.

The card reader may include a presence switch at least partially extending into the receiving slot for indicating when the data card is inserted into the receiving slot.

In an embodiment, the card reader may include a top wall extending from an upper end of the at least one side wall. The top wall and the base define ends of the receiving slot. The card reader may include at least one lower guide extending from the base and at least one upper guide extending from the top wall. Each guide may be provided near a front end of the receiving slot for guiding an insertion end of the data card into the receiving slot.

Each electrical contact may include a portion configured to engage the PCB and a portion configured to selectively engage the data card. The portion of each electrical contact configured to engage the data card may extend at least partially into the receiving slot.

The presence switch may include a first electrical lead and a second electrical lead selectively contactable with the first electrical lead. The second electrical lead may be movable between a first position in contact with the first electrical lead and a second position separated from the first electrical lead. The second electrical lead of the presence switch may include a finger extending into the receiving slot. The finger may be engageable by the data card to move the second electrical lead from the first position to the second position.

The card reader has a minimized footprint.

According to another aspect of the present disclosure, a card reader defining a data card receiving slot having an orientation substantially orthogonal to a plane of a printed circuit board on which the card reader is mounted is provided.

The card reader may include a base; and at least a side wall extending from the base, wherein the base and the side wall define the receiving slot.

The card reader may further include at least one electrical contact configured to electrically interconnect the data card and the printed circuit board when the data card is inserted into the receiving slot of the card reader.

The card reader may still further include at least one guide provided near a front end of the receiving slot for guiding an insertion end of the data card into the receiving slot. The card reader may further include at least one retaining tab at least partially extending into the receiving slot for frictionally engaging the data card when the data card is inserted into the receiving slot.

The card reader may include a presence switch at least partially extending into the receiving slot for indicating when the data card is inserted into the receiving slot.

According to yet another aspect of the present disclosure, a card reader is provided including a data card receiving slot defining a plane that has an orientation which is substantially orthogonal to a plane of a substrate on which the card reader is mounted. The card reader has a minimized footprint as compared to a card reader having a receiving slot which is oriented parallel to the plane of the substrate.

For a better understanding of the present invention and to show how it may be carried into effect, reference will now be made by way of example to the accompanying drawings.

DETAILED DESCRIPTION OF THE DRAWINGS

DETAILED DESCRIPTION OF EMBODIMENTS

Figure 1:
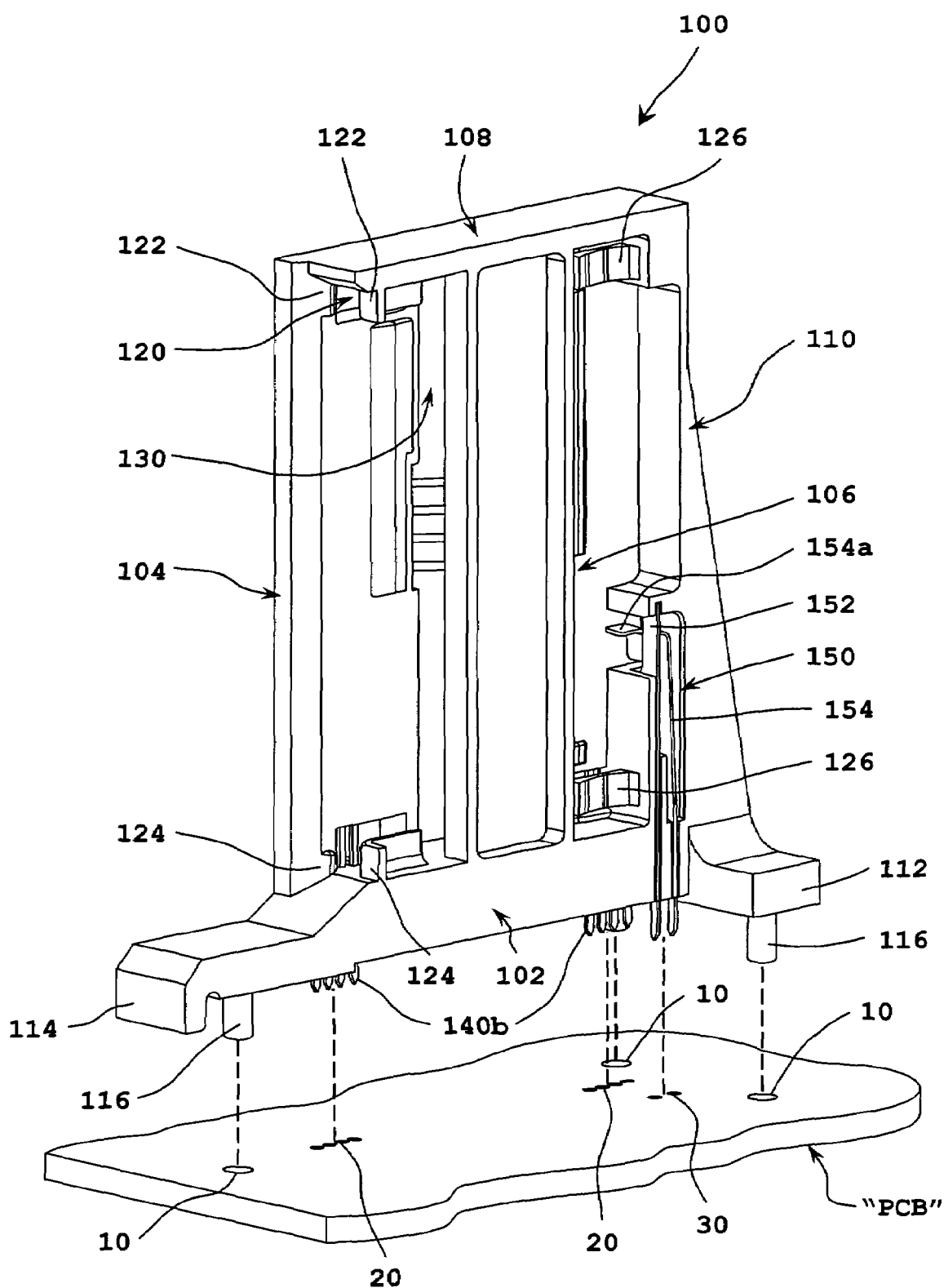
FIG. 1 is a right-side, perspective view of a card reader according to an embodiment of the present disclosure, shown separated from a printed circuit board.

Embodiments of the presently disclosed card reader will now be described in detail with reference to the drawing figures wherein like reference numerals identify similar or identical elements. As used herein and as is traditional, the term "distal" refers to that portion which is furthest from the user while the term "proximal" refers to that portion which is closest to the user. In addition, terms such as "above", "below", "forward", "rearward", etc. refer to the orientation of the figures or the direction of components and are simply used for convenience of description.

Referring initially to FIGS. 1-5, a card reader, according to an embodiment of the present disclosure, is generally designated as 100. Card reader 100 is configured and adapted for mounting and/or connection to a printed circuit board (PCB) or the like and is configured and adapted to selectively receive a data card or smart card "C" (see FIGS. 6-10) or the like therein in an orientation that is substantially orthogonal to a plane of the PCB.

As seen in FIGS. 1-5, card reader 100 comprises a dielectic body that includes a base 102, a first side wall 104 and a second side wall 106, each upstanding from base 102, a top wall 108 disposed at and interconnecting upper ends of side walls 104 and 106, and a rear wall 110 extending between base 102 and top wall 108 along a rear edge of at least one of first side wall 104 and second side wall 106.

Base 102 includes a pair of feet 112 extending laterally therefrom to provide stability to card reader 100 when mounted to the PCB. Feet 112 may be located near a rear end of base 102. Base 102 further includes a lip 114 formed near a front edge thereof and extending in a downward direction for engaging an edge of the PCB when card reader 100 is mounted thereto. Base 102 may include a plurality of locating bosses 116 extending from a bottom surface thereof for engaging locating apertures 10 formed in the PCB. Locating bosses 116 and locating apertures 10 function to properly position card reader 100 on the PCB.

As seen in FIGS. 1, 2, 4 and 5, base 102, first and second side walls 104, 106, and top wall 108 define an elongate receiving slot 120. Receiving slot 120 is configured and dimensioned to selectively, slidably receive smart card "C" therein. In an embodiment, card reader 100 includes a pair of upper guides 122 and a pair of lower guides 124 located near a front end of receiving slot 120, opposite rear wall 110. Upper guides 122 may extend from top wall 108 and lower guides 124 may extend from base 102. Upper and lower guides 122, 124 function to facilitate alignment of card "C" with receiving slot 120 during insertion of card "C" into receiving slot 120.

In an embodiment, card reader 100 may further include retaining tabs 126 that project into receiving slot 120 and narrow a width of receiving slot 120 at the location of tabs 126. As seen in FIGS. 1-5, tabs 126 extend from rear wall 110, however, it is envisioned and contemplated that tabs 126 may extend from base 102, first side wall 104, second side wall 106 and/or top wall 108. Retaining tabs 126 function to frictionally engage card "C", when inserted into receiving slot 120, in order to ensure proper insertion of card "C" in receiving slot 120 and proper contact with the electrical contacts of card reader 100, as will be discussed in greater detail below. Retaining tabs 126 may resiliently extend from rear wall 110 so as to deflect and bias upon insertion of card "C" into receiving slot 120 and passage thereacross, and to return to an un-biased condition upon withdrawal of card "C" from receiving slot 120.

With continued reference to FIGS. 1-5, first side wall 104 defines an aperture or window 130 formed therein. Window 130 of first side wall 104 provides access to and electrical interconnection of the electrical contacts with card "C" when card "C" is inserted into receiving slot 120, as will be discussed in greater detail below. Second side wall 106 is defined by a web extending between base 102 and top wall 108.

Figure 2:
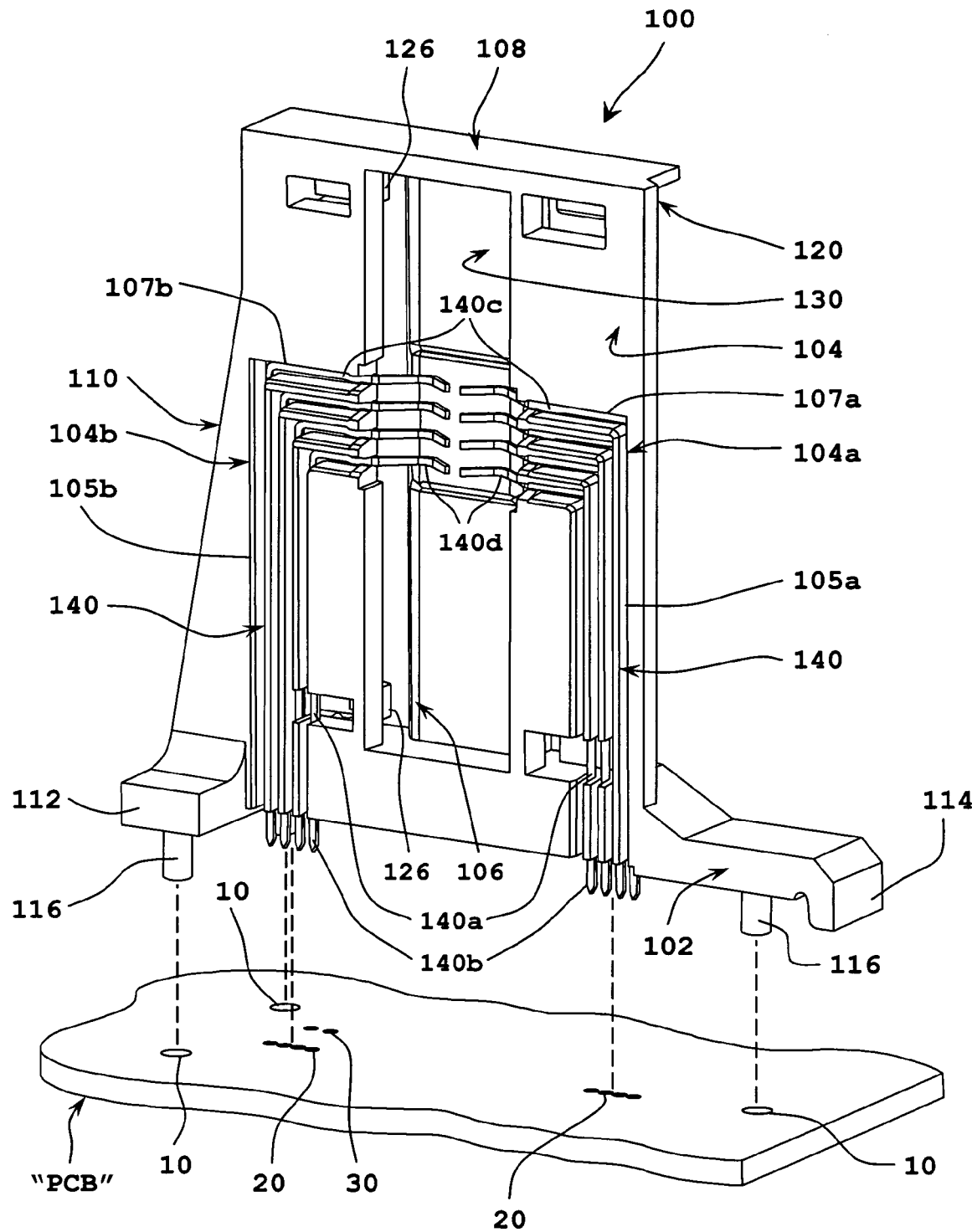
FIG. 2 is a left-side, perspective view of the card reader of FIG. 1, shown separated from a printed circuit board.
Figure 5:
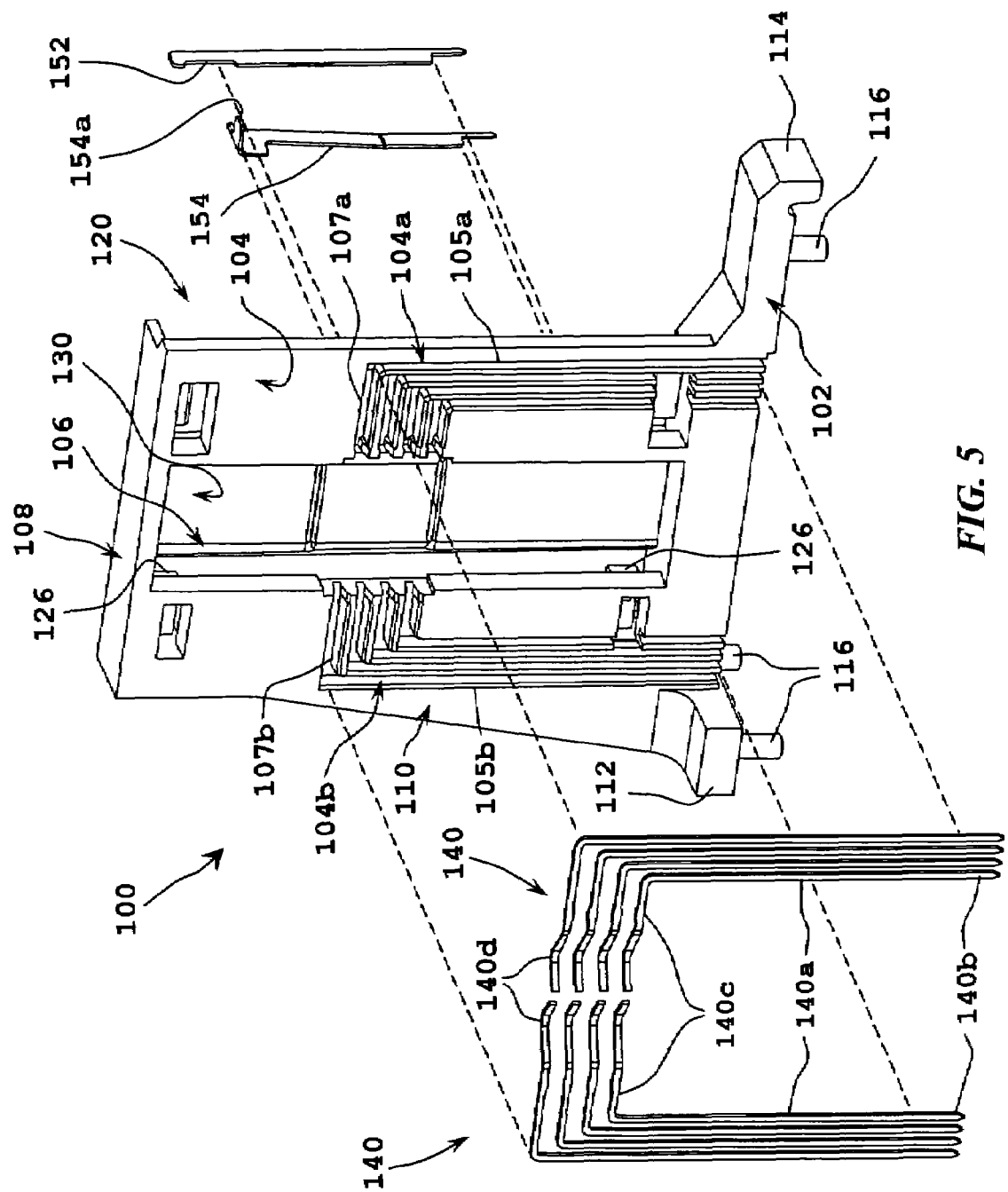
FIG. 5 is a left-side, exploded, perspective view of the card reader of FIGS. 1-4.

As seen in FIGS. 2 and 5, first side wall 104 includes a first set of grooves 104a formed in a rear surface thereof (i.e., a surface opposite receiving slot 120), wherein the first set of grooves 104a is located forward of window 130. First side wall 104 further includes a second set of grooves 104b formed in the rear surface thereof, wherein the second set of grooves 104b is located rearward of window 130. Each set of grooves 104a, 104b includes a longitudinal extending portion 105a, 105b, respectively, and a respective transverse extending portion 107a, 107b. Transverse extending portions 107a, 107b of each groove of the first and second set of grooves 104a, 104b extends into window 130 of first side wall 104. Each groove of the first and second set of grooves 104a, 104b is configured and adapted to support an electrical contact therein.

As seen in FIGS. 1-5, card reader 100 includes a plurality of electrical contacts 140 each operatively supported in a respective groove of the first and second set of grooves 104a, 104b. Each electrical contact 140 includes an elongate body portion 140a configured for positioning in a respective longitudinal extending portion 105a, 105b of the first and second set of grooves 104a, 104b. Each electrical contact 140 includes a PCB engagement tip 140b extending longitudinally from a first end of elongate body portion 140a, and a card engaging portion 140c extending orthogonally from a second end of elongate body portion 140a. Each card engaging portion 140c of electrical contacts 140 is configured for positioning in a respective transverse extending portion 107a, 107b of the first and second set of grooves 104a, 104b. Each card engaging portion 140c of electrical contacts 140 extends into window 130 of first side wall 104. Each card engaging portion 140c terminates in a resilient finger 140d which is configured to engage card "C" and, in particular, an electrical contact of card "C", when card "C" is inserted into receiving slot 120.

Each electrical contact 140 is fabricated from a suitable electrically conductive material, such as, for example, copper.

Figure 3:
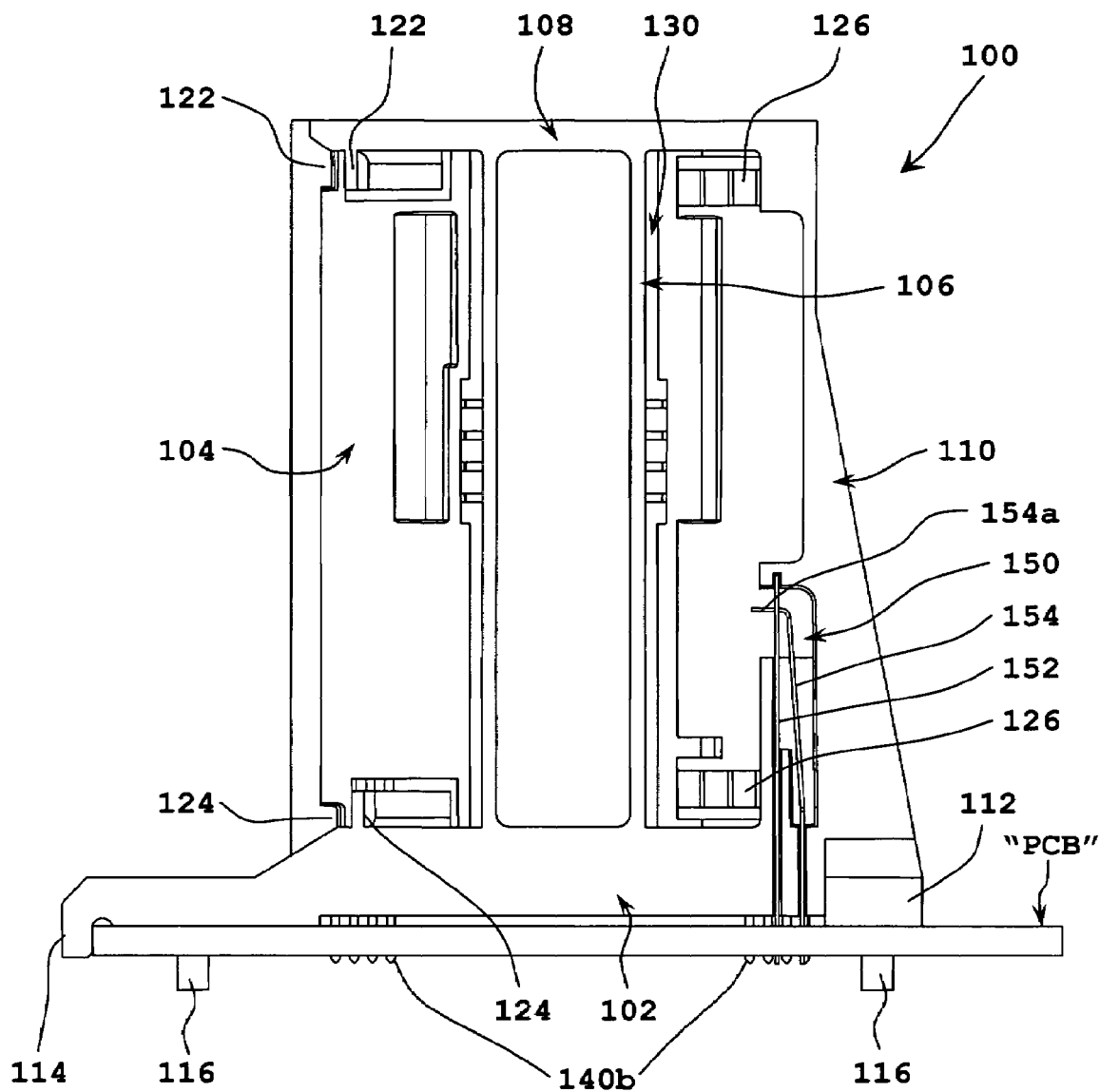
FIG. 3 is a right-side, elevational view of the card reader of FIGS. 1 and 2, shown supported on the printed circuit board.
Figure 4:
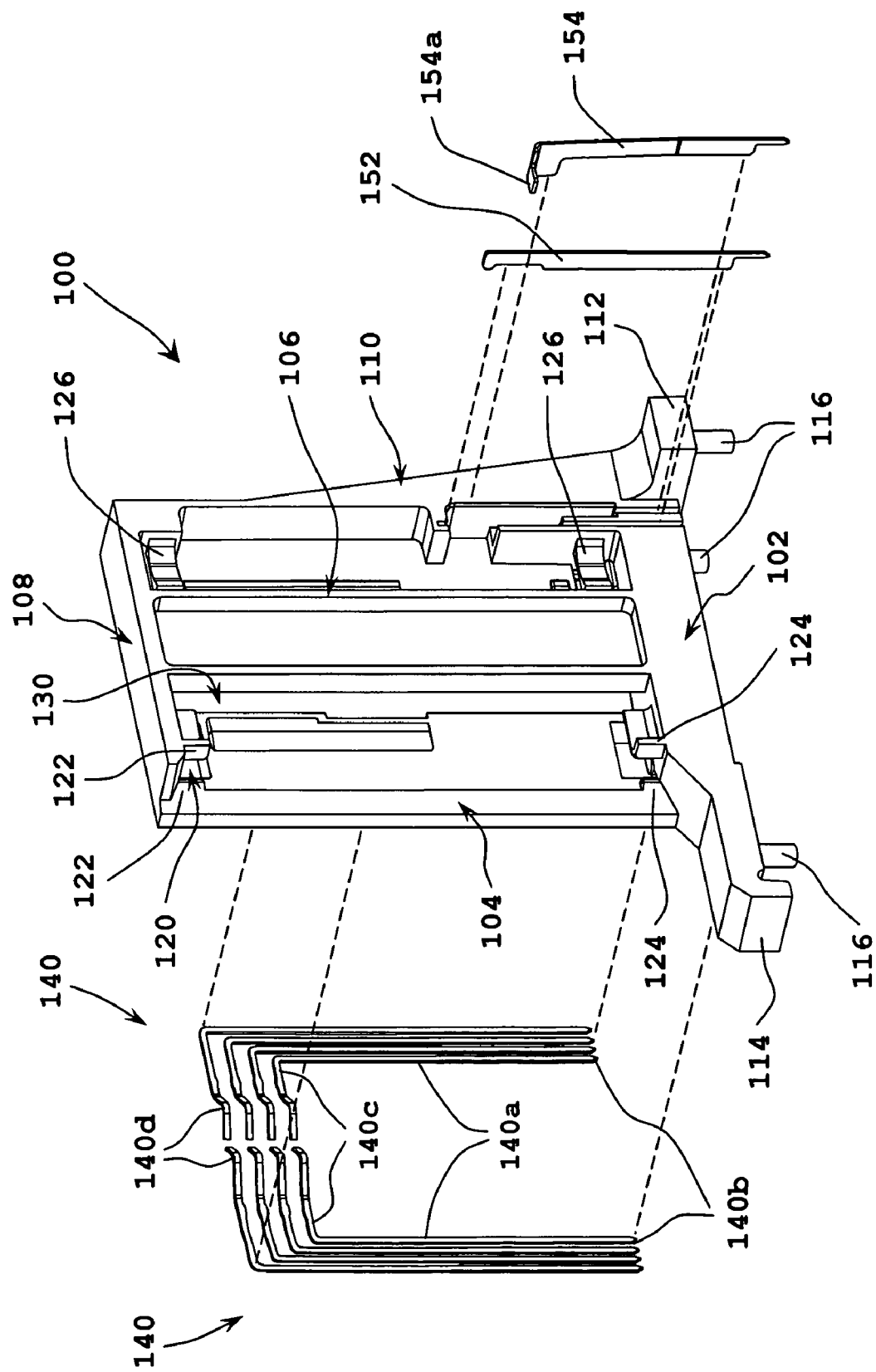
FIG. 4 is a right-side, exploded, perspective view of the card reader of FIGS. 1-3.
Figure 9:
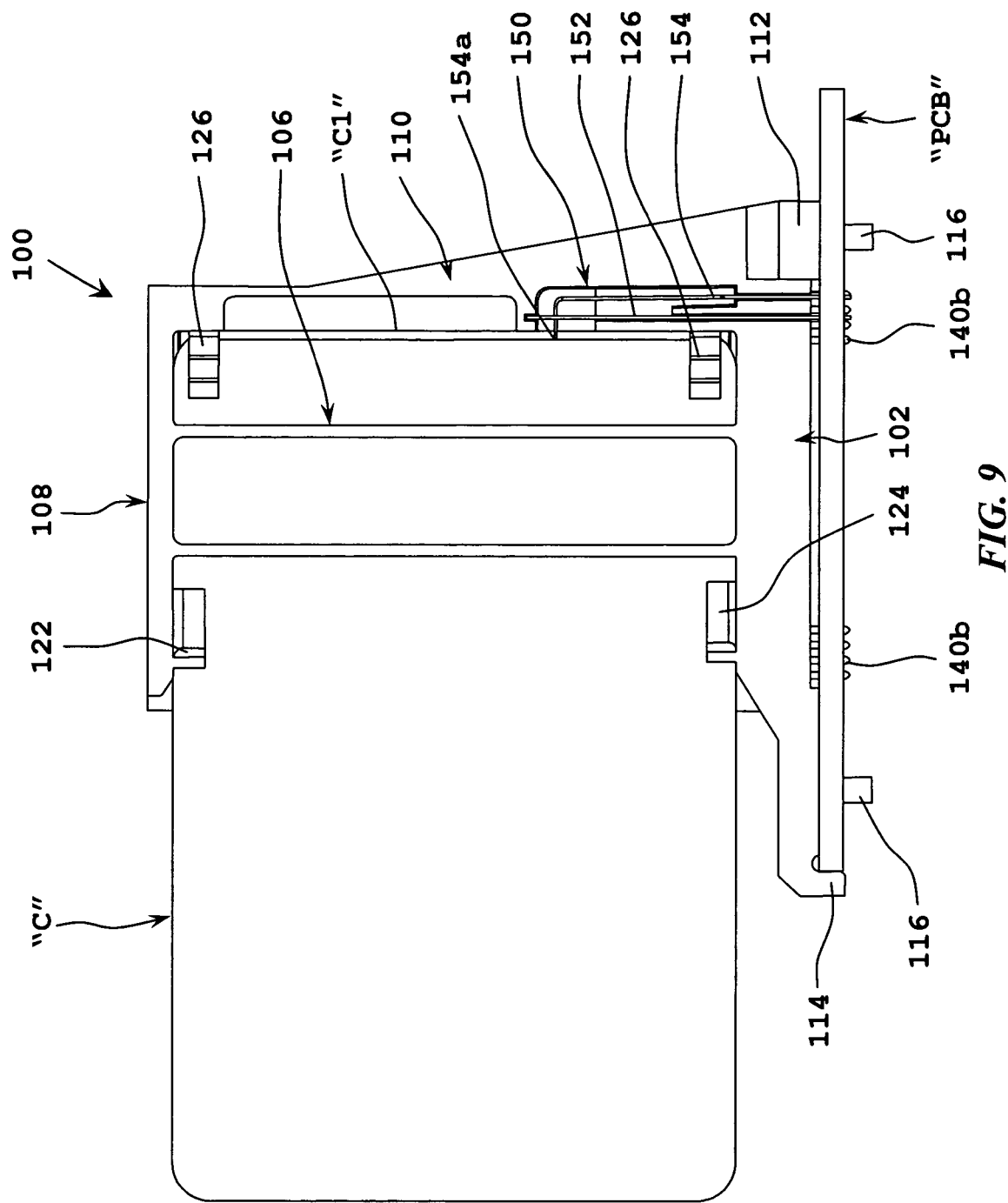
FIG. 9 is a right-side, elevational view of the card reader of FIGS. 1-8, illustrating the smart card fully inserted therein.

With continued reference to FIGS. 1-5, card reader 100 includes a presence switch 150 for identifying when card "C" is properly and fully inserted into receiving slot 120. Presence switch 150 includes a first electrical lead 152, and a second electrical lead 154 having an un-biased position, as seen in FIGS. 1 and 3, which is in contact with first electrical lead 152 (i.e., closing a circuit loop and presence switch 150) and a biased position, as seen in FIG. 9, which is out of contact with first electrical lead 152 (i.e., opening or breaking the circuit loop and opening presence switch 150). Second electrical lead 154 includes a finger 154a which extends into receiving slot 120.

In operation, when card "C" is fully and properly inserted into receiving slot 120, card "C" presses against finger 154a of second electrical lead 154 to deflect second electrical lead 154 to the biased position and separate first and second electrical leads 152 and 154 from one another and breaking the circuit loop. When card "C" is withdrawn from receiving slot 120, thereby removing the biasing force from second electrical lead 154, second electrical lead 154 returns to the first un-biased position in contact with first electrical lead 152 to close the circuit loop.

Each of the electrical leads 152 and 154 may be electrically connected to an electrical lead or pad provided on the PCB. In this manner, a processor may monitor when a card "C" is or is not present in card reader 100 by monitoring whether presence switch 150 is open or closed. Each of the electrical leads 152 and 154 of presence switch 150 are fabricated from a suitable electrically conductive material, such as, for example, copper.

Each of base 102, first and second side walls 104, 106, top wall 108 and rear wall 110 may be fabricated from a dielectric or electrically insulative material, such as, for example, plastic, polycarbonate and the like.

Figure 10:
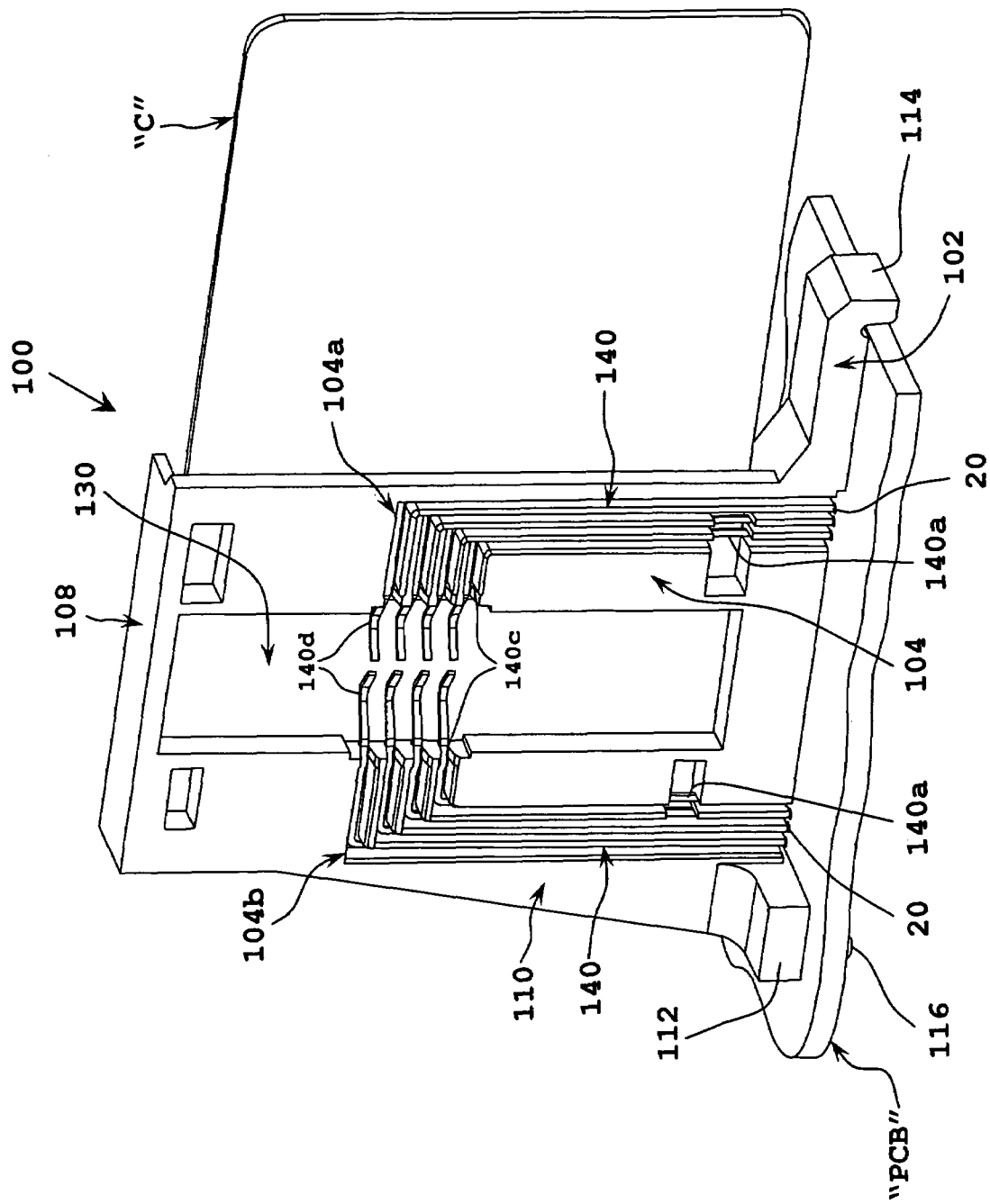
FIG. 10 is a left-side, perspective view of the card reader of FIGS. 1-9, illustrating the smart card fully inserted therein.
Figure 11:
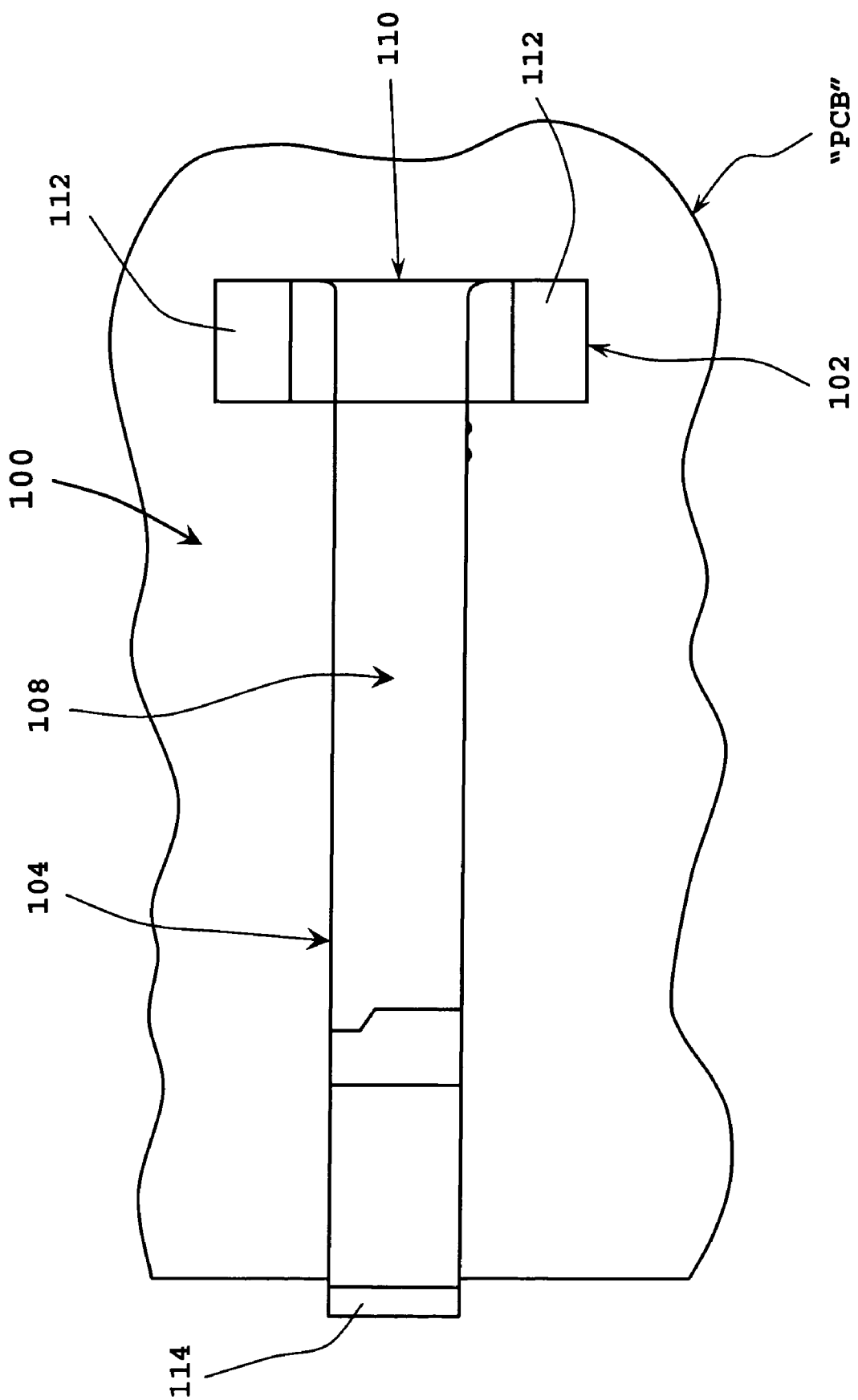
FIG. 11 is a top, plan view of the card reader of FIGS. 1-10, illustrating a footprint thereof.

Turning now to FIGS. 1-11, the mounting of card reader 100 to the PCB and the use of card reader 100 is provided. As mentioned supra, card reader 100 is mounted to the PCB such that receiving slot 120 thereof is oriented substantially orthogonal to (i.e., about 90°) a plane of the PCB. In this manner, when card "C" is inserted into receiving slot 120 of card reader 100, a plane defined by the card is oriented orthogonal to the plane defined by the PCB. With card reader 100 having a vertically oriented receiving slot 120, a footprint of card reader 100 is reduced, as seen in FIG. 11, as compared to a conventional card reader having a horizontally oriented receiving slot.

When mounting card reader 100 to the PCB, locating bosses 116 are aligned with corresponding and cooperating locating apertures 10 formed in the PCB. While card reader 100 is shown and described as having locating bosses 116 and the PCB locating apertures 10, it is contemplated that card reader 100 may be provided with locating apertures and the PCB may be provided with corresponding cooperating locating bosses. With card reader 100 properly aligned, card reader 100 is lowered onto the PCB such that locating bosses 116 enter locating apertures 10, and each electrical contact 140 and presence switch 150 electrically connect with respective corresponding electrical contact pads or pass through and electrically connect with respective corresponding electrical vias 20, 30. Additionally, lip 114 of base 102 extends over an edge of the PCB, see FIGS. 3 and 6-11, in order to provide additional support for card reader 100 when mounted to the PCB.

Figure 6:
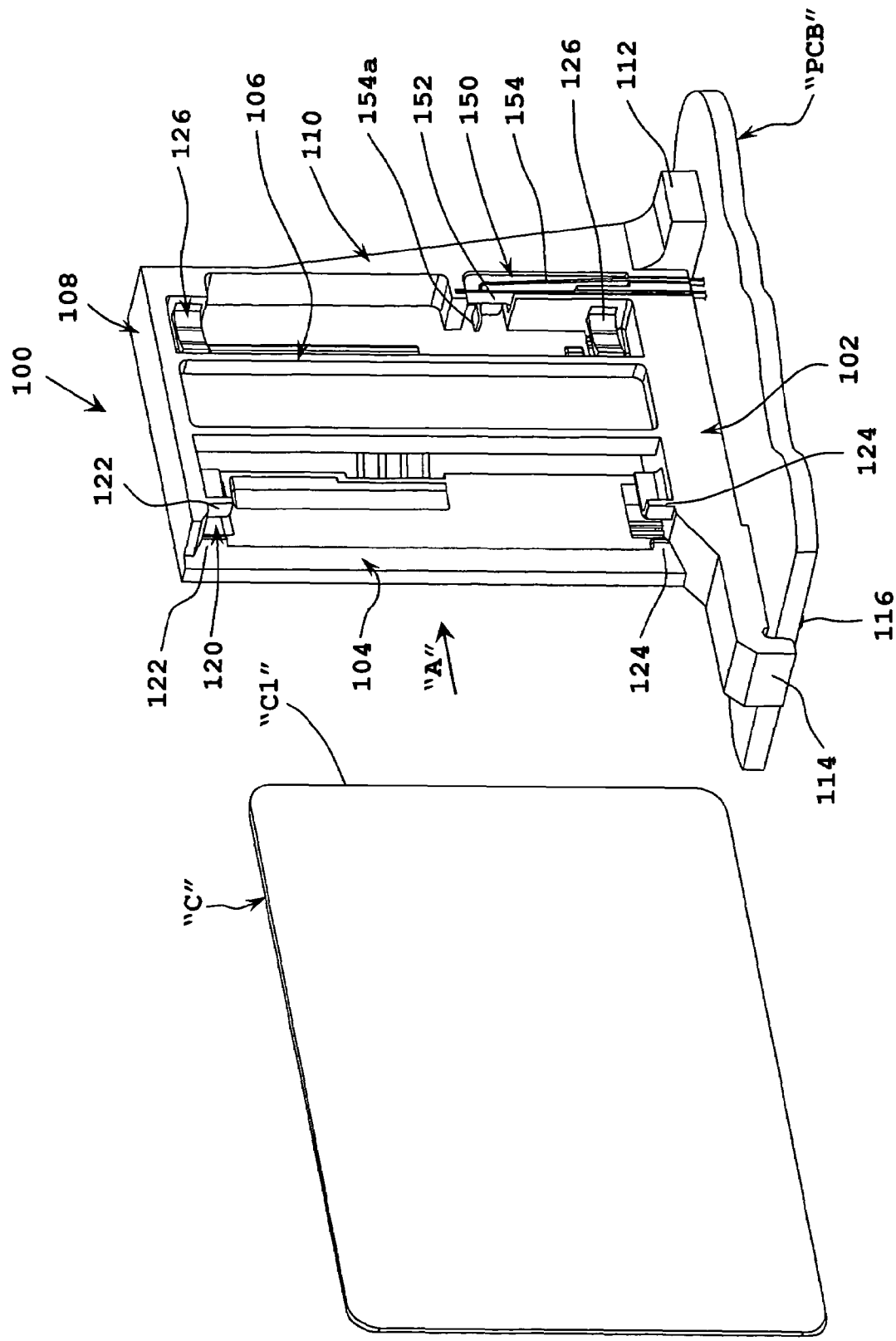
FIG. 6 is a right-side, perspective view of the card reader of FIGS. 1-5, illustrating the insertion of a smart card therein.
Figure 7:
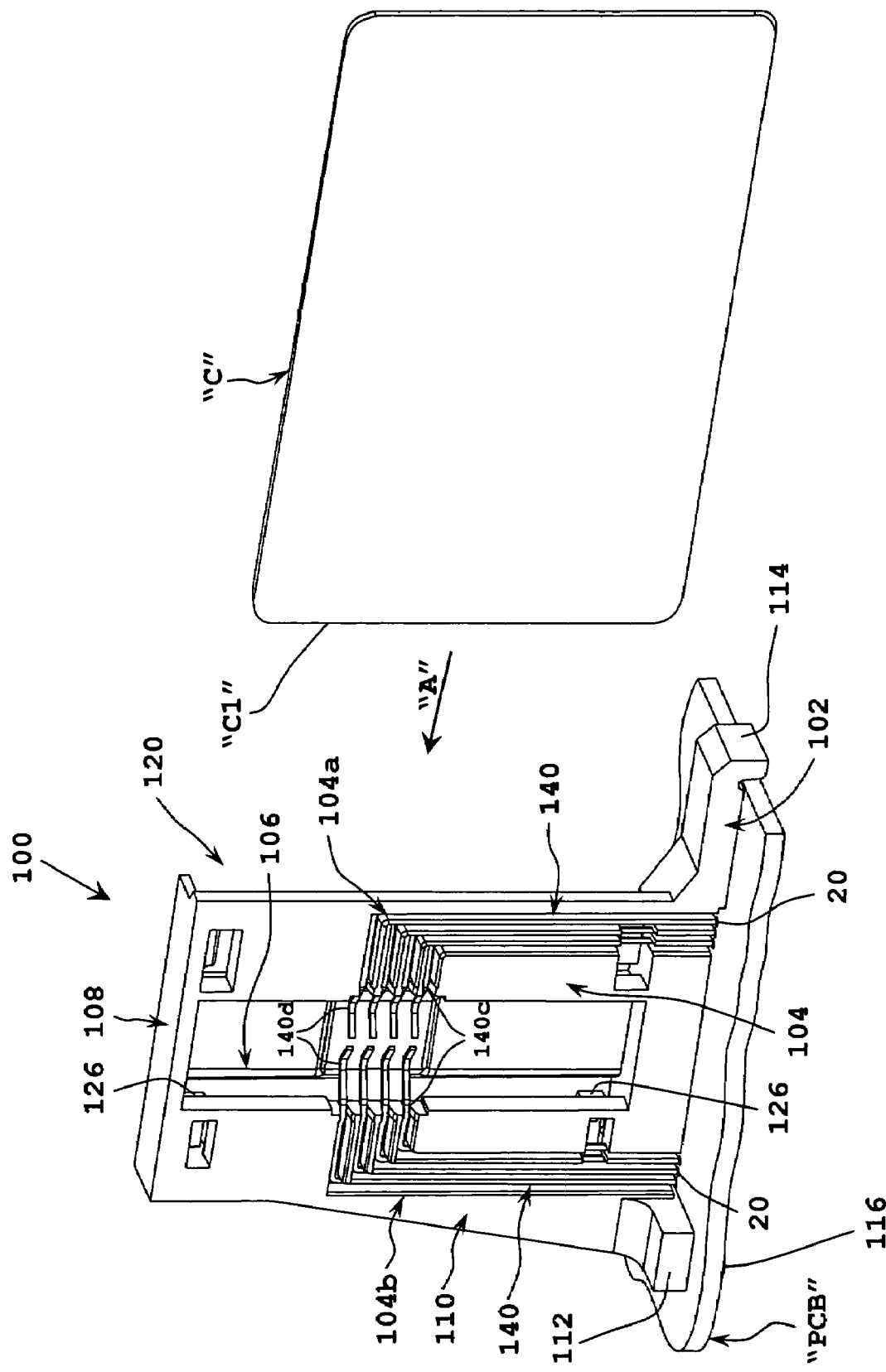
FIG. 7 is a left-side, perspective view of the card reader of FIGS. 1-6, illustrating the insertion of the smart card therein.

With card reader 100 mounted to the PCB, card reader 100 may now be used to receive a smart card "C" therein and transmit and/or transfer data between smart card "C" and the processor, computer or the like (not shown). As seen in FIGS. 6 and 7, smart card "C" is oriented such that an insertion end "C1" thereof is aligned with receiving slot 120 of card reader 100. When smart card "C" is oriented in such a manner, a plane defined by smart card "C" is oriented in a substantially orthogonal direction relative to a plane defined by the PCB.

As seen in FIGS. 6 and 7, smart card "C" is advanced toward receiving slot 120 of card reader 100, in the direction of arrow "A", which direction is parallel to the plane of the PCB. As insertion end "C1" of smart card "C" is introduced into receiving slot 120, upper and lower guides 122, 124 of card reader 100 further align smart card "C", to an orientation substantially parallel with a plane defined by receiving slot 120, for proper insertion into receiving slot 120.

Figure 8:
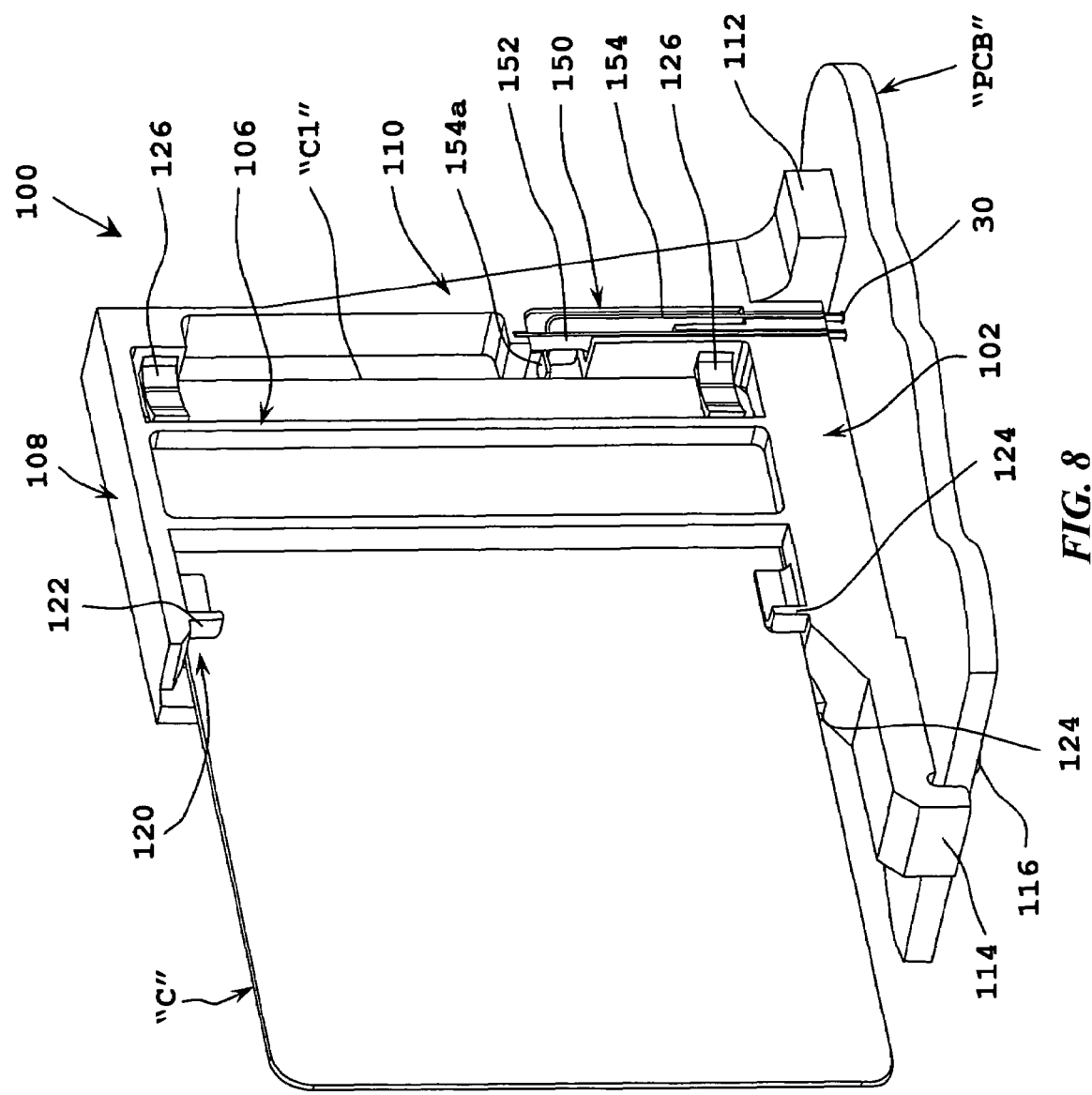
FIG. 8 is a right-side, perspective view of the card reader of FIGS. 1-7, illustrating the smart card fully inserted therein.

As seen in FIGS. 8-10, when smart card "C" is fully inserted into receiving slot 120 of card reader 100, insertion end "C1" of smart card "C" extends beyond a forward edge of retaining tabs 126. As discussed above, retaining tabs 126 function to ensure that smart card "C" is in proper contact with electrical contacts 140. Additionally, when smart card "C" is fully inserted into receiving slot 120, insertion end "C1" presses against finger 154a of second electrical lead 154 of presence switch 150, and urges second electrical lead 154 to a biased position where second electrical lead 154 is out of contact with first electrical lead 152, thereby breaking the circuit loop and opening presence switch 150, as discussed above.

With reference to FIG. 10, with smart card "C" fully and properly inserted into card reader 100, at least a portion of smart card "C" extends across window 130 formed in first side wall 104. In this manner, resilient finger 140d of each electrical contact 140 contacts a surface of smart card "C". Smart card "C" includes electrical contacts (not shown) on the surface thereof which are in registration with resilient fingers 140d when fully inserted into card reader 100, resilient fingers 140d of electrical contacts 140 complete a circuit therewith so as to transfer data between smart card "C" and the PCB and ultimately the processor or computer.

It is to be understood that the foregoing description is merely a disclosure of particular embodiments and is no way intended to limit the scope of the invention. Other possible modifications will be apparent to those skilled in the art and all modifications are to be defined by the following claims.

What is claimed is:

1. A card reader for mounting onto a printed circuit board and for selectively receiving a data card therein, the card reader comprising:
    a base;
    at least a side wall extending upwardly from the base;
    a lip extending downwardly from a front edge of the base and configured to engage an edge of the circuit board; and
    a receiving slot defined by at least the base and the side wall and being configured and dimensioned to selectively receive the data card therein as the data card is moved in a direction parallel to a plane defined by the printed circuit board, and wherein the receiving slot defines a plane that is substantially orthogonal to the plane of the printed circuit board.

2. The card reader according to claim 1, further comprising at least one electrical contact configured to electrically interconnect the data card and the printed circuit board when the data card is inserted into the receiving slot of the card reader.

3. The card reader according to claim 2, wherein the receiving slot, of the card reader is oriented such that when the data card is inserted into the receiving slot a plane of the data card is substantially orthogonal to the plane of the printed circuit board.

4. The card reader according to claim 2, further comprising at least one guide provided near a front end of the receiving slot for guiding an insertion end of the data card into the receiving slot.

5. The card reader according to claim 2, further comprising at least one retaining tab at least partially extending into the receiving slot for frictionally engaging the data card when the data card is inserted into the receiving slot.

6. The card reader according to claim 2, further comprising a presence switch at least partially extending into the receiving slot for indicating when the data card is inserted into the receiving slot.

7. The card reader according to claim 2, further comprising a top wall extending from an upper end of the at least one side wall, wherein the top wall and the base define ends of the receiving slot.

8. The card reader according to claim 7, further comprising at least one lower guide extending from the base and at least one upper guide extending from the lop wall, wherein each of said guides is provided near a front end of the receiving slot for guiding an insertion end of the data card into the receiving slot.

9. The card reader according to claim 2, wherein said at least one electrical contact includes a portion configured to engage the PCB and a portion configured to selectively engage the data card.

10. The card reader according to claim 9, wherein the portion of said at least one electrical contact configured to engage the data card extends at least partially into the receiving slot.

11. The card reader according to claim 6, wherein the presence switch includes a first electrical lead and a second electrical lead selectively contactable with the first electrical lead, wherein the second electrical lead is movable between a first position in contact with the first electrical lead and a second position separated from the first electrical lead.

12. The card reader according to claim 11, wherein the second electrical lead of the presence switch includes a finger extending into the receiving slot, wherein the finger is engageable by the data card to move the second electrical lead from the first position to the second position.

13. The card reader according to claim 1, wherein the card reader has a minimized footprint.

14. The card reader according to claim 1, further comprising a pair of feet extending laterally from respective opposite sides of the base to provide stability to the card reader when mounted to the printed circuit board.

15. A card reader comprising:
a dielectric body including:
    a base;
    at least one side wall extending upwardly from the base, wherein the base and the at least one side wall define a data card receiving slot having an orientation substantially orthogonal to a plane of a printed circuit board on which the card reader is mounted, wherein the data card receiving slot is configured to receive a data card that is moved in a direction parallel to the plane of the printed circuit board; and
    a pair of feet extending laterally from respective opposite sides of the base to provide stability to the card reader when mounted to the printed circuit board.

16. The card reader according to claim 15, further comprising at least one electrical contact configured to electrically interconnect the data card and the printed circuit board when the data card is inserted into the receiving slot of the card reader.

17. The card reader according to claim 15, further comprising at least one guide provided near a front end of the receiving slot for guiding an insertion end of the data card into the receiving slot.

18. The card reader according to claim 15, further comprising at least one retaining tab at least partially extending into the receiving slot for frictionally engaging the data card when the data card is inserted into the receiving slot.

19. The card reader according to claim 15, further comprising a presence switch at least partially extending into the receiving slot for indicating when the data card is inserted into the receiving slot.

20. A card reader comprising:
a dielectric body including:
    a base;
    a pair of feet extending laterally from respective opposite sides of the base;
    a lip extending downwardly from a front edge of the base; and
    at least one side wall extending upwardly from the base;
wherein the base and the at least one side wall define a data card receiving slot, the data card receiving slot defining a plane that has an orientation which is substantially orthogonal to a plane of a substrate on which the card reader is mounted, the data card receiving slot being configured to receive a data card that is moved in a direction parallel to the plane of the substrate, wherein the card reader has a minimized footprint as compared to a card reader having a receiving slot which is oriented parallel to the plane of the substrate.

* * * * *